United States Patent [19]

Millgard

[11] Patent Number: 5,256,001
[45] Date of Patent: Oct. 26, 1993

[54] CYLINDRICAL SYSTEM FOR IN-SITU TREATMENT OF UNDERWATER CONTAMINATED MATERIAL

[75] Inventor: V. Dennis Millgard, Orchard Lake, Mich.

[73] Assignee: Millgard Environmental Corporation, Livonia, Mich.

[21] Appl. No.: 10,156

[22] Filed: Jan. 28, 1993

[51] Int. Cl.⁵ .................... B09B 5/00; E02D 3/12
[52] U.S. Cl. .................... 405/128; 405/223; 405/269; 588/252
[58] Field of Search ............ 405/128, 129, 222, 223, 405/258, 266, 269; 588/252, 257

[56] References Cited

U.S. PATENT DOCUMENTS

| | | | |
|---|---|---|---|
| 3,023,585 | 3/1962 | Liver | 405/269 X |
| 4,844,839 | 7/1989 | Manchak | 405/128 X |
| 4,902,172 | 2/1990 | Fukuda | 405/269 |
| 5,127,765 | 7/1992 | Millgard | 405/128 |
| 5,135,058 | 8/1992 | Millgard et al. | 405/269 X |

*Primary Examiner*—David H. Corbin
*Attorney, Agent, or Firm*—Lloyd M. Forster

[57] ABSTRACT

System including method and apparatus for treating contaminated underwater sediment by lowering a cylindrical casing to an underbed, lowering a power driven Kelly bar with plural blade injecting and mixing tool fed with treatment material such as solidifying cement and flyash, providing a top circular cover for confining the sediment to be treated within the casing, injecting and mixing the treatment material through the Kelly bar and sequentially moving the casing with Kelly bar and top cover to adjacent treatment locations having full coverage provided with minimum overlap.

9 Claims, 3 Drawing Sheets

CYLINDRICAL SYSTEM FOR IN-SITU TREATMENT OF UNDERWATER CONTAMINATED MATERIAL

BACKGROUND OF THE INVENTION

U.S. Pat. No. 5,127,765, System for In-Situ Treatment of Underwater Contaminated Material, discloses a method and apparatus for treating contaminated underwater sediment by lowering a hollow square casing to an underground bed, lowering a power-driven Kelly bar with injecting and mixing blade fed with treatment material, such as solidifying cement and flyash, providing a top cover for confining the sediment to be treated within the casing, injecting and mixing the treatment material through the Kelly bar and sequentially moving the square casing with Kelly bar to adjacent treatment locations. Treatment material is discharged from the ends of the blade and mixed primarily within the cylindrical column described by the path of the blade.

BRIEF DESCRIPTION OF THE PRESENT INVENTION

Sequential sectional treatment of confined treatable portions of the submerged sediment bottom of water bodies is effected by the lowering of a cylindrical casing into contaminated material such as sedimentary silt, sludge, hazardous waste or other contaminated material which has settled at the bottom of the water body. The depth where the bottom edge of the cylindrical casing reaches a required penetration may involve a registered seal against a solid subsurface such as rock, or into an impervious clay layer or a specific elevation. The top of the casing should extend above the water elevation enough to allow holding it in place and also not to allow water to move into or out of the casing.

A top confinement cover shroud with a rotary Kelly bar projecting therethrough is lowered within the cylindrical casing, with substantial perimeter clearance, through the water down to a level abutting or closely adjacent the top surface of the contaminated material. The water passes gently between the casing as the shroud is lowered to required position, at which position an inflatable perimeter tube is expanded with a fluid, in most cases water, into sealing contact with the inner walls of the cylindrical casing, to thereby provide a pressure seal with complete confinement for a discrete portion of the contaminated material to be treated.

A rotary blade at the bottom end of the Kelly bar system has fluid passages, spaced radially along the blade and directed backwardly relative to rotational direction, supplied with fluid treating material, which through rotation of the blade is distributed and mixed throughout the cylindrical confined portion of the contaminated material, substantially conforming to the cylindrical casing. An axially spaced second rotary blade is provided, without fluid passages, above the bottom rotary blade, extending radially at right angles relative thereto, for additionally mixing the discharged material throughout the confined portion. In a typical case, the treatment material may be cement and flyash slurry which will set and harden over a period of hours to thereby encapsulate and render harmless the contaminated material.

This cylindrical casing is lowered and raised by a crane on land reaching out over the water; or as more practical in most cases, the process may be performed by a crane mounted on a floating barge secured by corner jacks engaging a solid bottom of the water body. The crane is mounted on a mobile tractor movable along the edge of the barge to successive positions for sequential overlapping treatment of successively isolated confined portions of the contaminated material. Upon completing treatment at successive sections along the entire length of the barge, the jacks are raised and the barge moved to a position for treating the next row of cylindrical portions of the contaminated material. Full coverage is effected by an optimized pattern of overlapping cylindrical successive placements of the cylindrical casing, which may be in the order of six feet in diameter. Depending on the nature of the contamination, optionally different treatments may be administered to the confined material. In the case of hard setting cement treatment, withdrawal of the casing before any appreciable setting takes place is feasible due to retention of the treated material, thoroughly coated by pressurized dispersion and mixing by the Kelly driven blade, by surrounding portions of untreated material. Overlapping of successive treatment sites to provide full coverage will assure ultimate containment solid encasement of the entire contaminated water bed.

In the case of nonsolidifying treatment, the confinement of successive portions of the contaminated material during administration of the treatment fluid provides an accurate control for the ratio of fluid injected and thoroughly mixed per predetermined volume of contaminated material.

The foregoing description is common to the prior U.S. Pat. No. 5,127,765, with the exception that a cylindrical casing of smaller size, e.g., six feet diameter, is employed in place of the larger square casing, e.g., in the order of fourteen feet square side dimension; and a pair of axially spaced radial mixing blades disposed at right angles, with the lower blade discharging at radially spaced positions are employed in place of a single blade discharging at the ends as disclosed in the prior patent. Accordingly, the disclosure of the present patent is confined to the novel distinctive aspects of the shroud cover with its inflatable "bumper boat" tube, and the multiple blade tool driven by Kelly bar projecting through the round cover shroud.

DETAILED DESCRIPTION OF THE DRAWINGS

Figure 1:
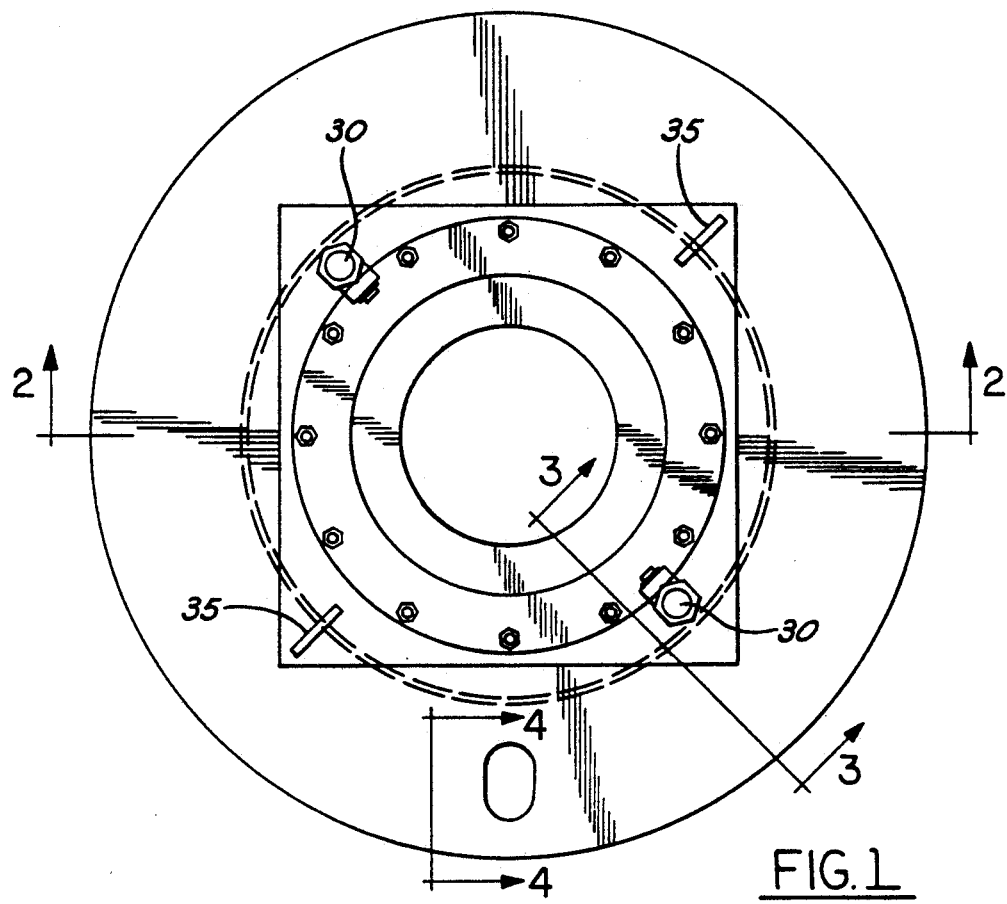
FIG. 1 is a plan view of the round confinement cover shroud employed in the present invention.
Figure 2:
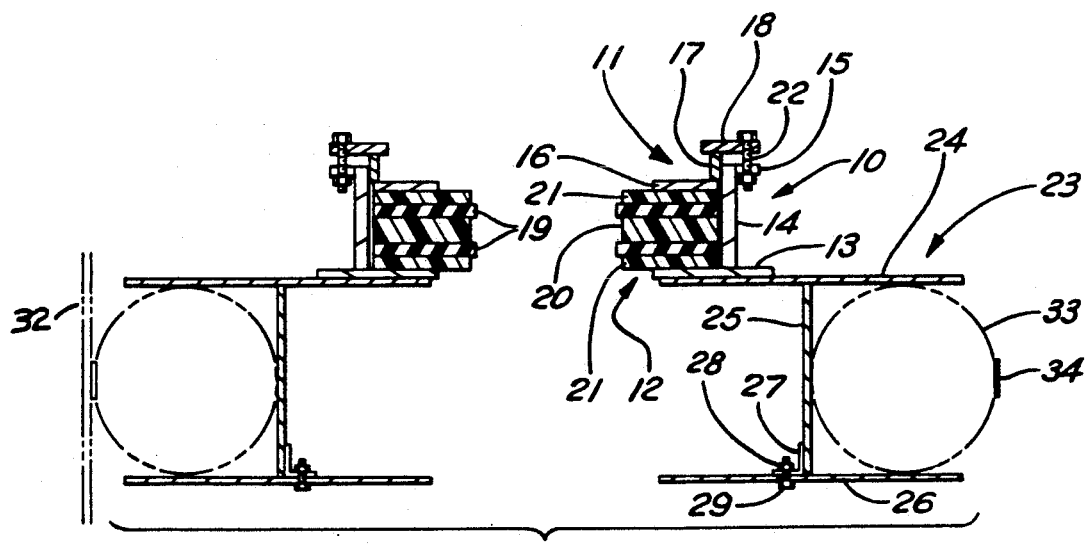
FIG. 2 is a sectional elevation taken along the line 2—2 of FIG. 1.

With reference to FIGS. 1 and 2, marine swivel assembly 10 of the confinement cover shroud of the present invention comprises mounting 11 for plastic swivels and rubber seals 12 having lower base plate 13 secured to tube 14 with lip 15. A lid comprising circular plate 16, tube 17 and circular plate 18 retains rubber seals 19, central plastic swivel 20 and outer plastic swivels 21 for rotation with a Kelly bar permitted by bolts 22 having a loose clearance fit.

Marine swivel and seal assembly 23 includes circular plate 24 on which plate 13 is welded, tube 25 welded to plate 24, and circular plate 26 bolted to angle 27 having welded nuts 28 engaged by bolts 29 for assembly retention of inflatable tube 33. The marine swivel assembly is adapted to provide a confinement cover shroud by sealing against cylindrical casing 32 through inflation of "bumper boat" tube 33 stretching rubber band 34 into engagement with the ID of cylindrical casing 32. Lifting lugs 35 secured to plate 13 provide means for crane connection to lower and raise the marine swivel assembly with inflatable "bumper boat" tube 33 within cylindrical casing 32 while tube 33 is deflated and contracted by rubber band 34.

With reference to FIGS. 7–10 the dual blade tool 40 employed in the present invention comprises a lower blade with a pair of lower radial blade extensions 41 on flight bar 42 extending through pipe 43. Pockets 44 having teeth 45, are spaced equally along the leading edges of flight bar 42, and fluid tubes 46 secured to the trailing edges of flight bar 42 are provided with discharge holes 47 directed at a 30° upward angle equally spaced between extremity holes 47a and 47b. Inlets 48 are provided for 46 from pipe 43 with inner tube ends cut to the profile of the pipe and with the outer ends of fluid tubes 46 closed by pipe plugs 49.

Upper flight bar 50 projecting through tube 43 at right angles to flight bar 42 is provided with pockets and teeth such as 44 and 45 on the lower flight bar, but without fluid tubes 46. Lower end of pipe 43 is provided with a closure cap 51 on which stinger projection 52 is welded having split ends 53 serving as entry drill teeth.

Figure 3:
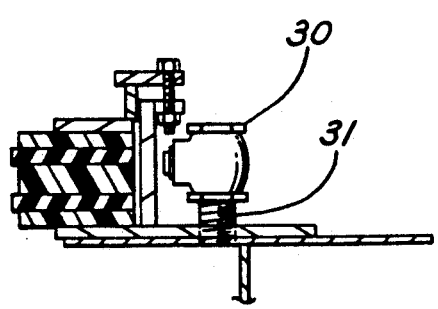
FIG. 3 is a fragmentary sectional view taken along the line 3—3 of FIG. 1.

With reference to FIG. 3, check valve 30 on threaded pipe 31 provides escape for overflow of air or fluid resulting from fluid pumped into the cylindrical casing through the Kelly bar.

Figure 4:
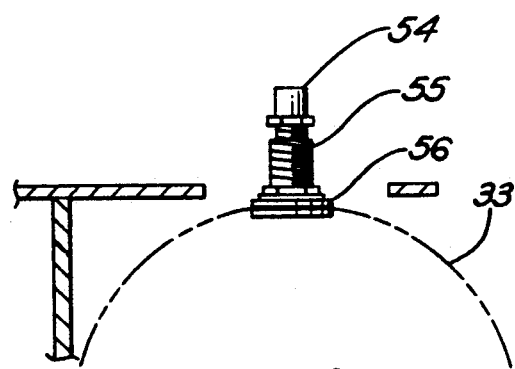
FIG. 4 is a fragmentary sectional view taken along the line 4—4 of FIG. 1.
Figure 5:
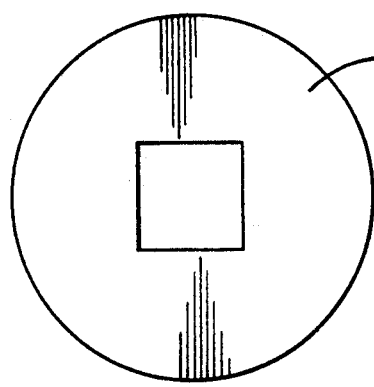
FIG. 5 is a plan view of a plastic swivel per se shown in section in the assembly view of FIG. 2.
Figure 6:
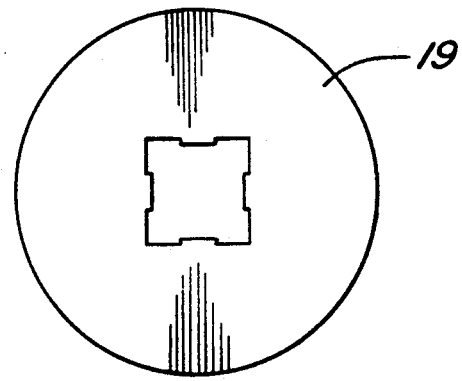
FIG. 6 is a plan view of a rubber seal per se shown in section in the assembly view of FIG. 2.
Figure 7:
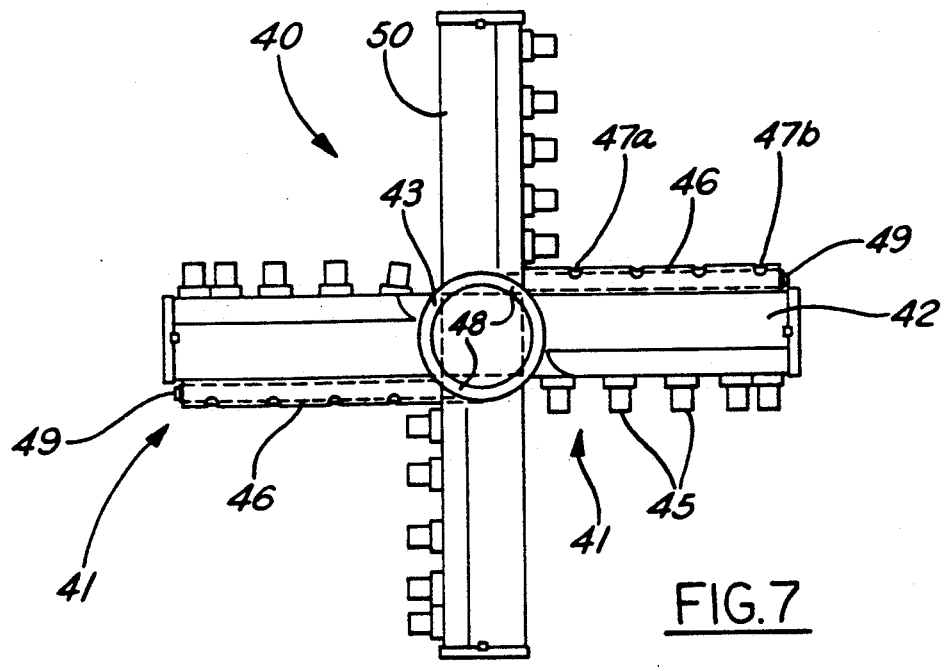
FIG. 7 is a plan view of the rotary multi-blade tool, with lower blade fluid dispensing bar, to be driven by a Kelly bar, not shown.
Figure 8:
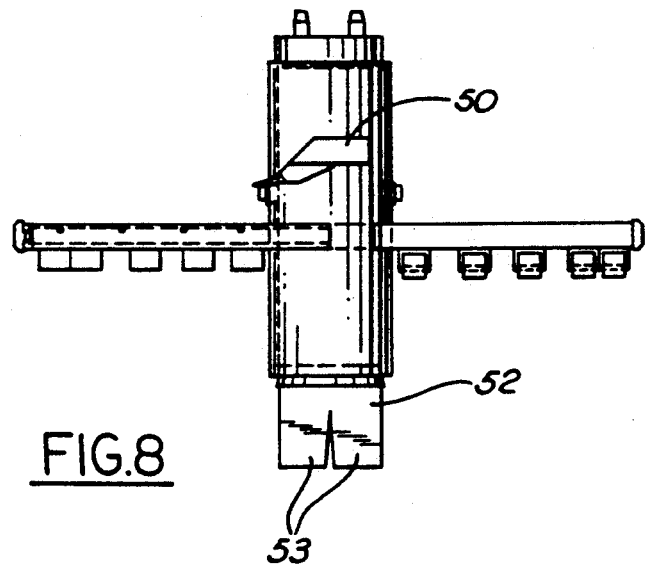
FIG. 8 is a side elevation of the tool illustrated in FIG. 7.
Figure 10:
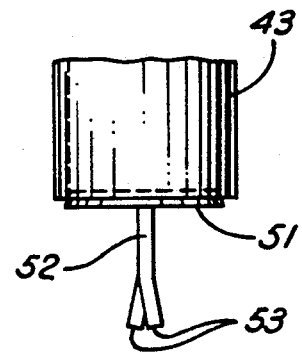
FIG. 10 is a fragmentary 90° spaced side view of the lower end of the tool illustrated in FIG. 8.
Figure 9:
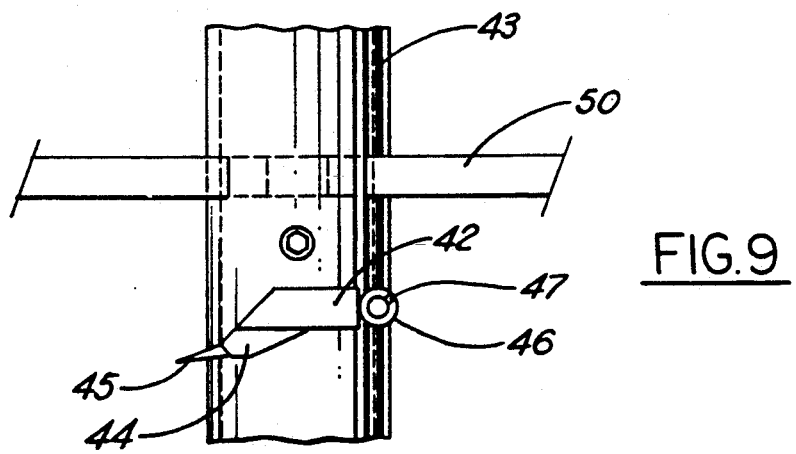
FIG. 9 is an enlarged fragmentary 90° spaced side view of the tool illustrated in FIG. 8.

With reference to FIG. 4, male adapter 54 and threaded pipe 55 are secured to brass bulkhead fitting 56 for inflating "bumper boat" tube 33 by suitable extension to inflation hose, not shown.

In operation, a square Kelly bar projecting through plastic swivels 20 and 21 and rubber seals 19 support, feed and rotate the dual blade tool within cylindrical casing 32.

From the foregoing description, it will be understood that the present invention incorporates improvements relative to the system of U.S. levels in close proximity to the casing, and fluid distribution at radially spaced outlets along the lower blade flight bar extensions provide improved fluid distribution and mixing compared to the square casing with two rotary blades discharging fluid from the ends; suspension of the confinement cover shroud from two lugs engageable by crane hooks as compared to resting during vertical transit on top of the mixing blade; radially spaced teeth on the mixing blades providing for more effective penetration and break-up of partially solidified sludge; a circular "bumper boat" tube with elastic band retraction providing a more effective seal than the inflatable square tube of the prior patent; and the assembly of the confinement cover shroud with plastic swivels and rubber seals, in a housing separate from the inflatable tube housing, which can be lowered into position independently of the mixing blade tool all contribute to improved operation.

Overlap for complete coverage can be minimized to approximately 0.9% by spacing treatment at successive sections along a row having "X" spacing equal to 0.866 times casing diameter and with alternate rows staggered with 0.75 diameter "Y" spacing.

I claim:

1. Water body treatment apparatus means for injection of treatment material for treating sedimentary silt, sludge, hazardous waste or other contaminated material which has settled at the bottom of a river, canal, pond, lagoon, or like water body, comprising hollow cylindrical casing means for substantially totally confining treatable portions of said material in-situ including circular cover means to provide enclosure confinement inserted within said cylindrical hollow casing to the upper level of said contaminated material prior to injection of said treatment material, means for injecting and mixing said treatment material during confinement in each portion comprising radial blade tool means having fluid discharge outlets radially spaced along said blade means, means for terminating each confinement, independently raising said cover means and said blade tool for movement with said casing to and confining successive adjacent portions to thereby effectively treat entire designated areas of a given water bed.

2. Apparatus of claim 1 wherein said radial blade tool means is provided with radially spaced teeth along leading edges and fluid outlets along trailing edges of radial blade extensions.

3. Apparatus of claim 2 wherein said fluid outlets extend with a 30° upward angle from pipes, each pipe having a closed outer end and an inlet connection to a central supply fed axially by means extending along the axial line of rotation of said tool.

4. Apparatus of claim 3 wherein additional radial blade tool means extend radially above and at right angles to said fluid distributing radial blade tool means.

5. Apparatus of claim 4 wherein radially spaced teeth are provided on the leading edges of said tool blade means with fluid outlets radially spaced on the trailing edge of said tool blade, said outlets being provided in a pipe having an outer end closure and an inner end connection to a central pipe supply.

6. Apparatus of claim 4 wherein said additional radial blade tool means has radially spaced teeth on the leading edge without fluid outlets on the trailing edge.

7. Apparatus of claim 1 including means for supporting said cover means during raising and lowering independent of said radial blade tool means.

8. Apparatus of claim 7 including confinement cover means comprising housing with plastic swivels and rubber seals having square openings for closely fitting Kelly bar secured to separate housing for inflatable "bumper boat" tube.

9. Apparatus of claim 8 including inflatable "bumper boat" tube with elastic retraction band on the outer perimeter serving to provide clearance for raising and lowering the confinement cover means with inflatable tube deflated.

* * * * *